US012749344B2

(12) United States Patent
Liao

(10) Patent No.: US 12,749,344 B2
(45) Date of Patent: Sep. 29, 2026

(54) IMAGE PROCESSING METHOD AND APPARATUS, ELECTRONIC DEVICE AND STORAGE MEDIUM

(71) Applicant: Beijing Zitiao Network Technology Co., Ltd., Beijing (CN)

(72) Inventor: Yunhao Liao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 20 days.

(21) Appl. No.: 18/870,344

(22) PCT Filed: May 26, 2023

(86) PCT No.: PCT/CN2023/096537

§ 371 (c)(1),
(2) Date: Nov. 27, 2024

(87) PCT Pub. No.: WO2023/231918

PCT Pub. Date: Dec. 7, 2023

(65) Prior Publication Data

US 2025/0329086 A1 Oct. 23, 2025

(30) Foreign Application Priority Data

Jun. 1, 2022 (CN) ......................... 202210621895.5

(51) Int. Cl.
*G06T 11/60* (2026.01)
*G06T 1/20* (2006.01)
(Continued)

(52) U.S. Cl.
CPC ................ *G06T 11/60* (2013.01); *G06T 1/20* (2013.01); *G06T 7/251* (2017.01); *G06T 11/10* (2026.01);
(Continued)

(58) Field of Classification Search
CPC . G06T 11/60; G06T 1/20; G06T 7/251; G06T 11/10; G06T 2207/30201; G06T 3/04; G06V 40/23; H04N 5/2621
See application file for complete search history.

(56) References Cited

U.S. PATENT DOCUMENTS 6,552,729 B1 * 4/2003 Di Bernardo .......... G06T 13/40
345/473
7,489,318 B1 2/2009 Wilt
(Continued)

FOREIGN PATENT DOCUMENTS

CN 111652830 A 9/2020
CN 112381918 A 2/2021
(Continued)

OTHER PUBLICATIONS

Shapiro, A., Cao, Y., & Faloutsos, P. (Jun. 2006). Style components. In Graphics interface (vol. 2006, pp. 33-39).*
(Continued)

*Primary Examiner* — Sarah Lhymn
(74) *Attorney, Agent, or Firm* — Astute IP Law Group

(57) ABSTRACT

Embodiments of the disclosure provide an image processing method and apparatus, electronic device and a storage medium. The method includes: collecting a to-be-processed image comprising a target object, and determining a style map, a transform matrix and a speed field map corresponding to the to-be-processed image; and processing the style map, the transform matrix, the speed field map and the to-be-processed image based on a single rendering channel to obtain a target special effect image corresponding to the to-be-processed image.

20 Claims, 4 Drawing Sheets

(51) Int. Cl.
*G06T 7/246* (2017.01)
*G06T 11/10* (2026.01)
*G06V 40/20* (2022.01)

(52) U.S. Cl.
CPC .... *G06V 40/23* (2022.01); *G06T 2207/30201* (2013.01)

(56) References Cited

U.S. PATENT DOCUMENTS

| | | | | |
|---|---|---|---|---|
| 11,948,274 | B1* | 4/2024 | Vavilala | G06N 3/045 |
| 2005/0195210 | A1 | 9/2005 | Demers et al. | |
| 2006/0274070 | A1* | 12/2006 | Herman | G06T 13/20 345/473 |
| 2013/0100132 | A1 | 4/2013 | Katayama et al. | |
| 2020/0219274 | A1* | 7/2020 | Afridi | G06N 3/04 |
| 2020/0250830 | A1* | 8/2020 | Chae | G06T 7/155 |
| 2022/0377257 | A1* | 11/2022 | Wilson | G06N 3/09 |
| 2024/0037885 | A1* | 2/2024 | Wang | G06F 3/04815 |

FOREIGN PATENT DOCUMENTS

| | | | |
|---|---|---|---|
| CN | 112419477 | A | 2/2021 |
| CN | 112562026 | A | 3/2021 |
| CN | 112750176 | A | 5/2021 |
| CN | 112819945 | A | 5/2021 |
| CN | 112884875 | A | 6/2021 |
| CN | 114040119 | A | 2/2022 |
| CN | 114092678 | A | 2/2022 |
| CN | 114240742 | A | 3/2022 |
| CN | 114331820 | A | 4/2022 |
| CN | 114387158 | A | 4/2022 |
| CN | 114866706 | A | 8/2022 |
| KR | 1020130017258 | A | 2/2013 |
| WO | 2021/027585 | A1 | 2/2021 |

OTHER PUBLICATIONS

Fan, X. (Apr. 2021). Application of style transfer algorithm in the design of animation pattern special effect. In Journal of Physics: Conference Series (vol. 1852, No. 2, p. 022054). IOP Publishing.*
International Search Report for PCT/CN2023/096537, mailed on Sep. 4, 2023, 6 pages.
Notification to Grant Patent Right for Invention for Chinese Patent Application No. 202210621895.5, mailed on Jul. 4, 2024, 6 pages.
Office Action for Chinese Patent Application No. 202210621895.5, mailed on Apr. 22, 2024, 12 pages.
Zhang et al., "Real-time Rendering of 3D Chinese Painting Effects", Journal of Computer-Aided Design & Computer Graphics, vol. 16, No. 11, Nov. 2004, 5 pages, with English Abstract.

* cited by examiner

IMAGE PROCESSING METHOD AND APPARATUS, ELECTRONIC DEVICE AND STORAGE MEDIUM

CROSS REFERENCE TO RELATED APPLICATIONS

This is a national stage application based on International Patent Application No. PCT/CN2023/096537, filed May 26, 2023, which claims priority to Chinese Patent Application No. 202210621895.5 filed Jun. 1, 2022, the disclosures of which are incorporated herein by reference in their entireties.

FIELD

The embodiments of the disclosure relate to the technical field of image processing, for example, to an image processing method and apparatus, electronic device and a storage medium.

BACKGROUND

More and more users want to shoot images with certain style characteristics through an application program, and the rendering of such images is mostly done in a manner of requiring multiple rendering channels.

SUMMARY

The disclosure provides an image processing method and apparatus, an electronic device and a storage medium.

According to a first aspect, an embodiment of the disclosure provides an image processing method, comprising:

collecting a to-be-processed image containing a target object, and determining a style map, a transform matrix, and a speed field map that correspond to the to-be-processed image; and processing the style map, the transform matrix, the speed field map and the to-be-processed image based on a single rendering channel to obtain a target special effect image corresponding to the to-be-processed image.

According to a second aspect, an embodiment of the disclosure further provides an image processing apparatus, comprising:

an image obtaining module configured to collect a to-be-processed image containing a target object, and determine a style map, a transform matrix, and a speed field map that correspond to the to-be-processed image; and an image processing module configured to process the style map, the transform matrix, the speed field map and the to-be-processed image based on a single rendering channel to obtain a target special effect image corresponding to the to-be-processed image.

According to a third aspect, an embodiment of the disclosure further provides an electronic device, comprising:

one or more processors;

a storage device configured to store one or more programs, when the one or more programs are executed by the one or more processors, the one or more processors implementing the image processing method according to any of the embodiments of the disclosure.

According to a fourth aspect, an embodiment of the disclosure further provides a storage medium including computer executable instructions that, when executed by a computer processor, are configured to perform the image processing method according to any of the embodiments of the disclosure.

BRIEF DESCRIPTION OF DRAWINGS

Throughout the drawings, the same or similar reference numbers refer to the same or similar elements. It should be understood that the drawings are schematic, and elements and elements are not necessarily drawn to scale.

DETAILED DESCRIPTION

Figure 1:
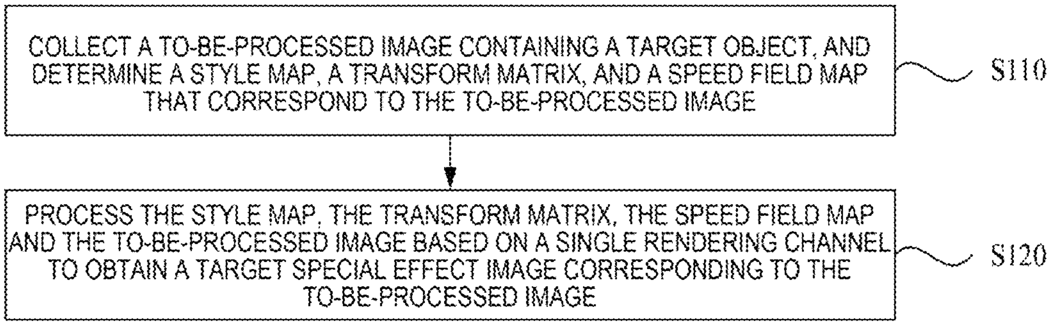
FIG. 1 is a schematic flowchart of an image processing method according to an embodiment of the disclosure.

When image rendering is carried out based on multiple rendering channels, a plurality of intermediate images can be generated and stored, then the plurality of intermediate images are rendered based on another rendering channel, the occupied content of the stored intermediate images exists, multi-channel rendering is needed, the channel utilization rate is low, and the condition that the image rendering efficiency is low is caused.

In view of the above, embodiments of the disclosure provide an image processing method and apparatus, an electronic device, and a storage medium.

Embodiments of the disclosure will be described below with reference to the accompanying drawings. While certain embodiments of the disclosure are shown in the drawings, it is to be understood that the disclosure may be implemented in various forms, and should not be construed as limited to the embodiments set forth herein, rather, these embodiments are provided for a more thorough and complete understanding of the present disclosure. It should be understood that the drawings and embodiments of the disclosure are for exemplary purposes only and are not intended to limit the scope of the disclosure.

It should be understood that the steps recited in the method embodiments of the disclosure may be performed in different orders, and/or in parallel. Further, the method embodiments may include additional steps and/or omit performing the illustrated steps. The scope of the disclosure is not limited in this respect.

As used herein, the term "comprising" and deformation thereof are open-ended, i.e., "including but not limited to". The term "based on" is "based at least in part on". The term "one embodiment" means "at least one embodiment"; the term "another embodiment" means "at least one further embodiment"; the term "some embodiments" means "at least some embodiments". The relevant definition of other terms will be given below.

It should be noted that concepts such as "first" and "second" mentioned in this disclosure are merely used to distinguish different apparatuses, modules, or units, and are not intended to limit the order of functions performed by the apparatuses, modules, or units or the mutual dependency relationship.

It should be noted that the modification of "a" and "a plurality" mentioned in this disclosure is illustrative and not limiting, and those skilled in the art should understand that "one or more" should be understood unless the context clearly indicates otherwise.

The names of messages or information interaction between multiple devices in embodiments of the disclosure are for illustrative purposes only and are not intended to limit the scope of such messages or information.

It can be understood that, before the embodiments of the disclosure are used, the types of personal information related to the disclosure, the usage scope, the usage scenario and the like should be notified to the user in an appropriate manner according to the relevant laws and regulations and obtain the authorization of the user.

For example, in response to receiving an active request from a user, prompt information is sent to the user to explicitly prompt the user that the requested operation will need to acquire and use the personal information of the user. Thus, the user may autonomously select whether to provide personal information to software or hardware such as an electronic device, an application program, a server, or a storage medium executing the operations of the embodiments of the disclosure according to the prompt information.

As an implementation, in response to receiving the active request of the user, the manner of sending the prompt information to the user may be, for example, a pop-up window, and the prompt information may be presented in a text manner in the pop-up window. In addition, the pop-up window may further carry a selection control for the user to select "agree" or "not agree" to provide personal information to the electronic device.

It may be understood that the above notification and obtaining a user authorization process is merely illustrative, and does not constitute a limitation on implementations of the disclosure, and other manners of meeting related laws and regulations may also be applied to implementations of the disclosure.

It may be understood that the data involved in this embodiment (including but not limited to the data itself, the acquisition or use of the data) should follow the requirements of the corresponding laws and regulations and related regulations.

Before the present embodiment is introduced, an application scenario may be described first, and image rendering may be performed in the embodiments of the disclosure. For example, in a process of generating a special effect image, image rendering needs to be performed, and image processing may be performed by using the embodiment of the disclosure. The process of generating the special effect image may be a short video shooting process, a video call, a video live, or a multi-person session scenario, and the embodiments of the disclosure may be used. It should also be noted that the image rendering is mainly used in further processing the image after the image is collected.

In this embodiment, the apparatus for performing the special effect image processing method provided by the embodiments of the disclosure may be integrated into application software that supports special effect image processing functions, and the software may be installed in an electronic device, for example, the electronic device may be a mobile terminal or a personal computer (PC) terminal. The application software may be a type of software for image/video processing, as long as image/video processing may be implemented.

FIG. 1 is a schematic flowchart of an image processing method according to an embodiment of the disclosure. The embodiment of the disclosure may perform image rendering, and the method may be performed by an image processing apparatus, which may be implemented in the form of software and/or hardware, for example, by an electronic device, which may be a mobile terminal, a PC terminal, a server, or the like. The implementation of this embodiment may be performed by a server, or may be performed by a client, or may be performed by a client and a server in cooperation.

As shown in FIG. 1, the method includes the following steps.

S110: collect a to-be-processed image containing a target object, and determine a style map, a transform matrix, and a speed field map that correspond to the to-be-processed image.

In this embodiment, in the application software or application program that supports the special effect image processing function, the control for triggering the special effect may be developed in advance, and when it is detected that the user triggers the control, the special effect trigger operation may be responded, thereby collect the to-be-processed image, and processing the to-be-processed image.

The to-be-processed image may be an image shot by an application, or an image shot based on a camera device carried by the terminal device, or each collected video frame may be used as the to-be-processed image in a video shooting process. It should be noted that the processing of each video frame is rendered by adopting the rendering mode provided by the embodiment of the disclosure, meanwhile, after the special effect image corresponding to the first video frame is rendered, the present embodiment is repeatedly executed on the next video frame to determine the corresponding special effect video frame. The target object may be a user, an animal, plant, or the like in in-shot image. For example, the target object may correspond to a user, that is, a special effect processing needs to be performed on the user in the to-be-processed image to obtain a corresponding special effect image. In the embodiment of the disclosure, the target object is which user in the in-shot image may be pre-calibrated, or all users may be used as target user. For example, only a specific user special effect needs to be rendered, a user image corresponding to a specific user may be uploaded in advance, and a user feature of the user is determined, so that when a corresponding user is included in the display interface, a feature recognition algorithm is used to determine whether the user is a specific user calibrated, if yes, the special effect processing is performed, otherwise, the special effect processing is not performed.

In the disclosed embodiment, determine a trigger timing of the collecting a to-be-processed image containing the target object comprises at least one of the following: detecting that a special effect processing prop is triggered; detecting that the collected audio information triggers the special effect wake-up word; detecting that an in-shot image includes the target object; and detecting that the body action of the target object is consistent with the preset body action.

The special effect processing prop may be triggered by a key displayed on the application software display interface, and the trigger representation of the key needs to determine the current special effect image. In practical applications, if the user triggers the key, it may be considered that the special effect processing is to be performed, and the collected to-be-processed image needs to be processed.

Alternatively, the voice information may be collect based on the microphone array arranged on the terminal device, and the voice information may be analyzed and processed, and if the processing result includes the word added with the special effect, it indicates that the special effect adding function is triggered. A benefit of determining whether to add a special effect based on the content of the voice information is to avoid interaction between the user and the display page, and improve intelligence added to the special effect. In another implementation, whether the face image of the user is included in the visual field range is determined according to the shooting visual field range of the mobile terminal, and when the face image of the user is detected, the application software may take the event of detecting the face image as the operation for collecting the to-be-processed image; or may be that the special effect processing action, for example, an "OK" gesture, is triggered by the object in the in-shot image is detected. It should be understood by those skilled in the art that the page turning condition for selecting which event is used as the special effect may be set according to actual conditions, which is not specifically limited in the embodiments of the disclosure.

In this embodiment, the style map may be understood as a map corresponding to a feature style, and the style map corresponds to a face region of a target object in the to-be-processed image. The speed field map may be understood as a view describing pixel motion, which is a schematic diagram of deformation from a macroscopic representation. The speed field map mainly corresponds to a motion field map of pixels in the face region. The speed field map may be understood as being formed by a plurality of matrices, and each matrix is used to represent a displacement parameter of a corresponding pixel. The transform matrix is used to process a pre-established mesh model to convert the mesh model to the face region of the target object. The single rendering channel may be understood that: when rendering the to-be-processed image based on the shader, a single rendering channel may be used to process the above image to obtain a corresponding target special effect image. The single rendering channel is used for processing, so that multiple intermediate images can be prevented from being generated in the rendering process, and when the image is rendered based on the intermediate image, the condition that the rendering efficiency is low is caused when the image is rendered based on the intermediate image. That is to say, in the embodiments of the disclosure, since a single rendering channel is adopted for processing, only corresponding coordinates need to be converted, and multiple intermediate images need not be obtained, thereby reducing memory occupation.

In an embodiment of the disclosure, determining a style map, a transform matrix, and a speed field map corresponding to an to-be-processed image may be: processing the to-be-processed image based on a target style map generative model to obtain a style map corresponding to a target region, wherein the target region corresponds to a face region of the target object; determining a speed field map corresponding to at least one vertex texture coordinate in the mesh model, wherein the mesh model corresponds to a face region of a target object; determining a transform matrix corresponding to the to-be-processed image in a rendering pipeline to perform projection transform on the mesh model based on the transform matrix, so that the transformed mesh model corresponds to a face region of the target object; wherein the texture coordinates of the mesh model are respectively consistent with the texture coordinates of the style map and the speed field map.

It should be noted that the style map, the transform matrix and the speed field map corresponding to each to-be-processed image are different, and when the to-be-processed image is transformed, the result obtained after the to-be-processed being processed also has a certain difference. Here, one to-be-processed image is used as an example for description.

The target style map generative model may be a pre-generated model for converting the to-be-processed image into a corresponding style map. The target style model may be a stylegan model based on a generative adversarial network (GAN). The converted style map may be taken as a style map. The style feature corresponding to the style map may be a style feature required by any user, and the style feature may be that the training sample is corresponding, for example, the training sample is a sample corresponding to the feature style A, and the target style map generative model corresponds to the style A. Correspondingly, the obtained style map is also an image whose feature style is A, and the image at this time may be used as the GAN image. Correspondingly, a corresponding algorithm or model may be used to determine the speed field map corresponding to the to-be-processed image. The speed field map is a texture image recording two-dimensional (2D) vector information, that is, the speed field map is an image recording the texture coordinate offset of each vertex in the mesh model. For example, the speed field map Flowmap is essentially a texture image that records 2D vector information. The color on the speed field map, which is typically a Red Green (RG) channel, records the direction of the vector field at a certain point, allowing a point on the model to be characteristic of quantitative flow. The flow effect is simulated by offsetting uv in the shader and sampling the texture, i.e., determining the offset uv by the vector field recorded by the RG channel to simulate the flow effect. By determining the speed field, the deformation displacement corresponding to the corresponding pixel point may be determined, and then the display information of the corresponding pixel point is taken and rendered to obtain the special effect image. The Quad mesh mesh model is pre-established, the mesh model is composed of a plurality of patches, each patch corresponds to a plurality of vertex texture coordinates, and the vertex texture coordinates in the mesh model may be converted into a window space (that is, a screen space) based on the determined transform matrix corresponding to the to-be-processed image. The window space corresponds to a space of the to-be-processed image. The transform matrix may be a matrix transform to the vertex texture coordinates of the mesh model to transform the mesh model into the window space. In this case, the window space may be understood as the space corresponding to the display interface.

The mesh model, the style map and the speed field map are all corresponding, for example, the texture coordinates of the vertices corresponding to the mesh model are 0~1, then the texture coordinates of the style map and the speed field map are also 0~1, and each vertex texture coordinate is a one-to-one correspondence.

In an embodiment of the disclosure, by determining the above information, a style map and a speed field map may be obtained, a target special effect map effect that needs to be converted may be determined, and color information of a corresponding pixel point is sampled and rendered based on the render channel, and a target special effect image is obtained.

S120: process the style map, the transform matrix, the speed field map and the to-be-processed image based on a single rendering channel to obtain a target special effect image corresponding to the to-be-processed image.

The single rendering channel may be understood as a rendering channel to render the obtained result to obtain a target special effect image corresponding to the to-be-processed image.

In this embodiment, the processing the style map, the transform matrix, the speed field map and the to-be-processed image based on the single rendering channel to obtain the target special effect image corresponding to the to-be-processed image includes: determining a to-be-processed pixel coordinate of the at least one model texture coordinate in mesh model in the to-be-processed image based on the transform matrix; determining a target pixel coordinate of the at least one model texture coordinate in the to-be-processed image based on the at least one to-be-processed pixel coordinate, the at least one model texture coordinate, and the speed field map; determining a target style texture coordinate of the at least one model texture coordinate corresponding to the style map based on the at least one target pixel coordinate and the transform matrix; and determining a target special effect image based on the target pixel coordinate corresponding to the same model texture coordinate and the pixel attribute of the target style texture coordinate.

Figure 2:
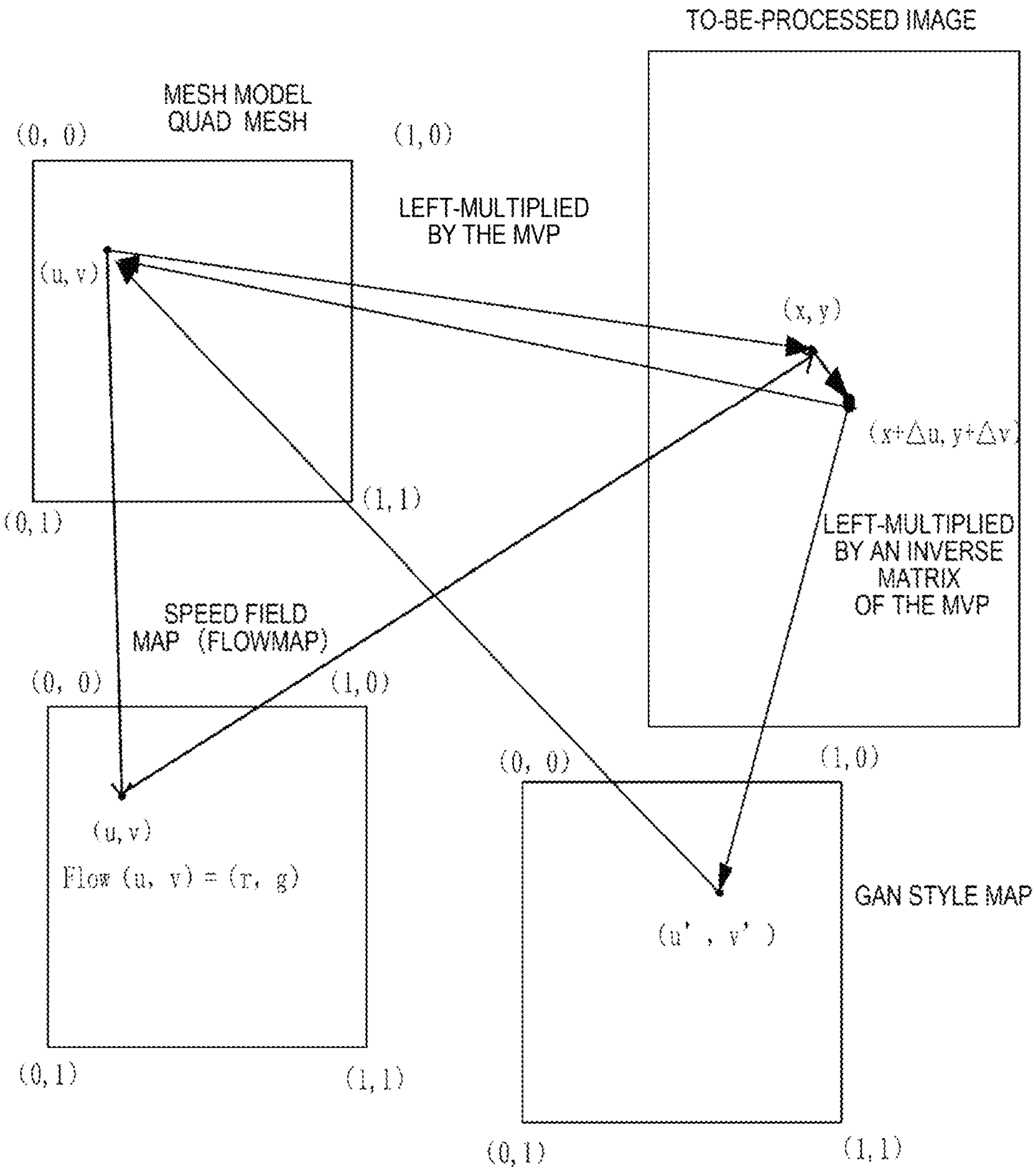
FIG. 2 is a schematic diagram of determining a pixel attribute corresponding to a to-be-rendered point according to an embodiment of the disclosure.

The mesh model is composed of a plurality of patches, each patch is composed of a plurality of, for example, at least six vertices, each vertex has a corresponding texture coordinate, and an interpolation operation may be performed based on the vertex texture coordinates of each patch to obtain each mesh point located on the patch. Meanwhile, texture coordinates corresponding to each mesh point may be determined according to the vertex texture coordinates and used as mesh texture coordinates. The mesh model is shown in FIG. 2, the upper left model vertex is (0, 0), and the lower right model vertex is (1, 1), that is, the model texture coordinate of a certain point in the mesh model is (u, v). The processing method for each model texture coordinate is the same, and the model texture coordinates (u, v) are taken as an example for description. The model texture coordinates of the mesh model may be converted from the model space into the window space (screen space) based on the transform matrix, that is, the same space corresponding to the to-be-processed image. In this case, coordinates of each model texture coordinate corresponding to the to-be-processed image may be obtained and used as the to-be-processed pixel coordinates. That is, the coordinates of the to-be-processed pixel are corresponding coordinates after the texture coordinates of each model being converted to the to-be-processed image. The target texture coordinate is a final corresponding pixel corresponding to the mesh texture coordinate, and the pixel corresponds to a point on the to-be-processed image. The target style texture coordinates may be understood as corresponding texture coordinates after the model texture coordinates correspond to the GAN image, to obtain display attributes corresponding to the target style texture coordinates.

For example, the target pixel coordinates and the target style texture coordinates corresponding to the grid texture coordinates may be determined based on the above steps, respectively, the display attribute of the target pixel coordinate and the display attribute of the target style texture coordinate may be obtained, and the display attribute corresponding to the grid texture coordinate may be determined. Therefore, the target special effect image may be determined based on the display attribute of each grid texture coordinate in the mesh model and the display attribute corresponding to the area other than the mesh model in the to-be-processed image.

In this embodiment, for the model texture coordinate, the to-be-processed pixel coordinate of the current model texture coordinate in the to-be-processed image is determined based on the current model texture coordinate left-multiplied by transform matrix.

The transform matrix includes a model matrix, a visual matrix, and a projection matrix. A model matrix, configured to convert the coordinates into coordinates corresponding to the world coordinate system. The visual matrix is configured to transform all vertices from the world coordinate system to a coordinate system at the camera viewing angle, which is essentially a translation and rotation operation. Determining the View matrix requires knowledge of the position of the camera and the orientation of the camera. The projection matrix is mainly configured to convert vertex coordinates to corresponding xyz transitions to [−1, 1]. Subsequently, the transform matrix is referred to as an MVP matrix. By left-multiplying the model texture coordinates (u, v) by the MVP matrix, the model texture coordinates can be converted into the window space.

For example, by left-multiplying each model texture coordinate by the MVP matrix, a pixel coordinate corresponding to the model texture coordinate on the to-be-processed image is obtained, and the model texture coordinate is used as the to-be-processed pixel coordinate (x, y). For example, referring to FIG. 2, after the model texture coordinate (u, v) is left-multiplied by the MVP matrix, a pixel (x, y) corresponding to the to-be-processed image is obtained. In a manner of determining the coordinates of the to-be-processed pixels, it may be determined that each point in the mesh model corresponds to a pixel in the to-be-processed image, and then further processing is performed based on the style map and the deformation image to obtain a display attribute of each point corresponding to the mesh model in the face region, to obtain the target special effect image.

Based on the above embodiment, after obtaining the to-be-processed pixel coordinates corresponding to the model texture coordinates, it is further necessary to determine a deformation tensor corresponding to the mesh texture coordinates, that is, the deformation displacement, to determine a corresponding pixel point based on the deformation displacement, and then obtain the display attribute corresponding to the pixel point and rendering the display attribute.

In an embodiment, the determining target pixel coordinate of the at least one model texture coordinate in the to-be-processed image based on the at least one to-be-processed pixel coordinate, the at least one model texture coordinate, and the speed field map comprises: for a model texture coordinate, determining, in the speed field map, a current displacement texture coordinate corresponding to a current model texture coordinate; and determining a target pixel coordinate of the current model texture coordinate based on the current displacement texture coordinate and a corresponding to-be-processed pixel coordinate.

The mesh model corresponds to the speed field map, that is, the coordinates corresponding to the speed field map are the same as the model texture coordinates of the mesh model. Correspondingly, the pixel attribute of each point in the speed field includes Red Green Blue Alpha (RGBA), where the RG may be used as the offsets Δu and Δv respectively corresponding to respective model texture coordinates. For example, with continued reference to FIG. 2, the to-be-processed pixel coordinate corresponding to the model texture coordinate (u, v) is (x, y), and the flow (u, v)=(r, g) may be known based on the model texture coordinate (u, v), where r, g respectively correspond to the coordinate offset Au, Av, and the target pixel point coordinate corresponding to the model texture corresponding to the to-be-processed image may be obtained as (x+Δu, y+Δv). The above steps may be repeated to obtain the target pixel coordinates corresponding to each model texture coordinate. Based on the target pixel coordinate and the to-be-processed image, a pixel attribute corresponding to the target pixel coordinate may be obtained, for example, the pixel attribute may include an RGB value and a value a, and a value of a is mainly used to represent a transparency value of the alpha channel in the rendering process.

It may be understood that the processing is: obtaining a pixel attribute corresponding to the current displacement texture coordinate, and determining a coordinate offset based on at least two attribute values in the pixel attribute; and accumulating the to-be-processed pixel coordinates based on the coordinate offset to obtain the target pixel coordinate.

In an embodiment, after the pixel attribute corresponding to the model texture coordinate is determined based on the above manner, in order to obtain an image corresponding to a style, the target style texture coordinate corresponding to the style map may be determined based on the target pixel coordinate, to superimpose or blend the pixel attribute of the target pixel based on the pixel attribute of the target style texture coordinate, to obtain the final pixel attribute.

In an embodiment, the determining the target style texture coordinates of the at least one model texture coordinate corresponding to the style map based on the at least one target pixel coordinate and the transform matrix includes: obtaining, in the style map, a target style texture coordinate corresponding to a current model texture coordinate based on a target pixel coordinate of the current model texture coordinate left-multiplied by an inverse matrix of the transform matrix.

It may be understood that, after the target pixel coordinates corresponding to the current model texture coordinates are determined, in order to obtain the corresponding style feature image, in conjunction with the GAN image, that is, the style map, needs to be processed to determining which coordinate point (target style texture coordinate) in the deformed GAN image corresponds to the texture coordinate of the current model, and then the pixel attribute of the target style texture coordinate is obtained.

For example, still referring to FIG. 2, based on the target pixel coordinate (x+Δu, y+Δv) left-multiplied by the inverse matrix of MVP matrix, the target pixel coordinate (x+Δu, y+Δv) may be converted into the model space to obtain the target texture coordinate (u', v') of the target pixel coordinate. Obtaining a pixel attribute of the target texture coordinate (u', v'), the pixel attribute including an RGB value and a value a.

After determining the target texture coordinate and the target pixel coordinate corresponding to each model texture coordinate based on the above manner, the target pixel attribute of the corresponding model texture coordinate may be determined based on the pixel attribute of the target texture coordinate and the pixel attribute of the target pixel coordinate. By the above manner, the pixel attribute of the corresponding pixel point is determined in combination with the deformation, the pixel attribute of the GAN image is further combined, and the effect that the rendering target special effect image is closer to the corresponding style feature is improved.

In an embodiment, the determining the target special effect image based on the target pixel coordinate corresponding to the same model texture coordinate and the pixel attribute of the target style texture coordinate includes: for the model texture coordinate, obtaining a first pixel attribute of a target pixel coordinate corresponding to the current model texture coordinate in the to-be-processed image, and obtaining a second pixel attribute corresponding to the target style texture coordinate in the style map; determining a target pixel attribute used when rendering the current model texture coordinate based on the first pixel attribute and the second pixel attribute; and determining a target special effect image based on the target pixel attribute and the to-be-processed image of the at least one model texture coordinate.

For example, for each model texture coordinate, the processing manner is the same, and one model texture coordinate is processed as an example based on this. Obtaining a first pixel attribute of the target pixel coordinate corresponding to the to-be-processed image according to the target pixel coordinate corresponding to the current model texture coordinate. The first pixel attribute includes an RGB value and a value of the pixel, where a represents a transparency value. Meanwhile, pixel attribute corresponding to the target style texture coordinate may be used as the second pixel attribute according to the current model texture coordinate. The second pixel attribute also includes the RGB value and a value of the pixel. By performing fusion processing on the first pixel attribute and the second pixel attribute, for example, according to a preset fusion function, the fusion function includes a fusion proportion, to obtain a target pixel attribute, that is, a target RGB value and a value, of the texture coordinate of the current model. Based on the target RGB value and a value of each model texture coordinate, the face region may be rendered. Correspondingly, the target special effect image may be obtained based on the target pixel attribute of the face region and the pixel attribute of the other region in the to-be-processed image.

For example, still referring to FIG. 2, pixel attributes of the target style texture coordinates (u', v') and pixel attributes of the target pixel coordinates (x+Δu, y+Δv) are jointly assigned to the model texture coordinates (u, v). Based on the above embodiment, the determining the target special effect image based on the target pixel attribute of the at least one model texture coordinate and the to-be-processed image includes: determining the target special effect image based on a target pixel attribute corresponding to the face region and a pixel attribute other than the face region in the to-be-processed image.

For example, a target special effect image corresponding to the to-be-processed image may be obtained by fusing the target pixel attribute corresponding to the face region and the pixel attribute other than the face region in the to-be-processed image.

Based on the above embodiment, if a corresponding target special effect video is to be obtained, the above processing may be performed on the sequentially collected to-be-processed images to obtain a corresponding target special effect video. The special effect processing may also be performed according to the uploaded timestamp of each to-be-processed image to obtain the target special effect video spliced according to the timestamp.

Based on the above embodiment, the style feature of the style map may correspond to a generation feature or a geographic area feature. The generation feature may correspond to a certain generation or a certain period of decoration feature. The geographic area feature may be a decoration feature associated with each geographic area. For example, if the generation feature corresponds to a decoration feature in which the face is fat, a special bun, and a special makeup look are present, the GAN image, that is, the style map may be a face image in which the above-described decoration process is performed on the face area in to-be-processed images, and in this case, a bun or the like may be involved. The above rendering step may be performed to process the to-be-processed image to obtain a final target special effect image.

Figure 3:
FIG. 3 is a schematic diagram of a rendering effect according to an embodiment of the disclosure.

For example, if the style feature corresponding to the style map corresponds to the makeup and hair features of the Song Dynasty Period. When the operation provided by the embodiments of the disclosure is triggered, referring to FIG. 3, after the to-be-processed image containing the target object is collected, the style map, the transform matrix, and the speed field map may be determined based on the embodiments of the disclosure, and the target special effect image meeting the feature of the Song Dynasty Period is obtained based on the single rendering channel, as shown in FIG. 3.

According to the embodiment of the disclosure, when the to-be-processed image containing the target object is collected, the style map, the transform matrix and the speed field map corresponding to the to-be-processed image are determined; based on the single rendering channel, the style map, the transform matrix, the speed field map and the to-be-processed image are processed to obtain the target special effect image corresponding to the to-be-processed image, so that avoids that a plurality of intermediate transition images need to be obtained when the multi-rendering channels are used for data rendering processing, and the intermediate transition image is rendered based on the next rendering channel. That is, not only is the multiple rendering channels participating in the whole rendering process, but also the intermediate image needs to be stored in the rendering process, the situation that the memory is occupied exists, the data rendering data is carried out based on a single rendering channel, the situation that the memory is occupied and the number of rendering channels is large can be avoided, and the image rendering efficiency can be improved.

Figure 4:
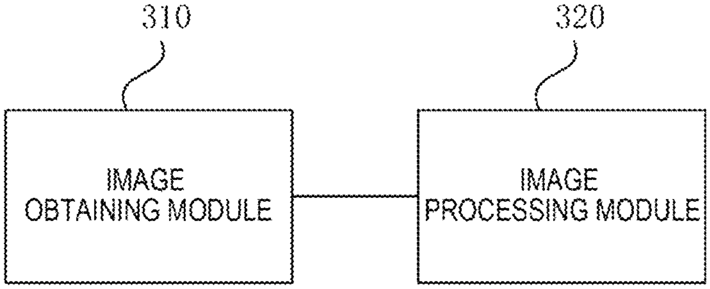
FIG. 4 is a schematic structural diagram of an image processing apparatus according to an embodiment of the disclosure.

FIG. 4 is a schematic structural diagram of an image processing apparatus according to an embodiment of the disclosure. As shown in FIG. 4, the apparatus includes: an image obtaining module 310 and an image processing module 320.

The image obtaining module 310 is configured to determine a style map, a transform matrix, and a speed field map corresponding to the to-be-processed image when the to-be-processed image containing the target object is collected; and the image processing module 320 is configured to process the style map, the transform matrix, the speed field map, and the to-be-processed image based on a single rendering channel to obtain a target special effect image corresponding to the to-be-processed image.

Based on the above embodiment, a trigger timing of the collecting a to-be-processed image containing the target object comprises at least one of the following:

- detecting that a special effect processing prop is triggered;
- detecting that collected audio information triggers a special effect wake-up word;
- detecting that an in-shot image includes a target object; or
- detecting that a body action of the target object is consistent with a preset body action.

On the basis of the above embodiments, the image obtaining module comprises:

- a style map determining unit, configured to process the to-be-processed image based on a target style map generative model to obtain a style map corresponding to a target region, where the target region corresponds to a face region of the target object;
- a speed field map determining unit configured to determine a speed field map corresponding to the to-be-processed image; wherein the mesh model corresponds to a face region of a target object;
- a transform matrix determining unit, configured to determine a transform matrix corresponding to the to-be-processed image in a rendering pipeline, to transform the vertex texture coordinates of the mesh model based on the transform matrix, so that the transformed mesh model corresponds to a face region of a target object in the to-be-processed image,
- where the texture coordinates of the mesh model are respectively consistent with the texture coordinates of the style map and the speed field map.

On the basis of the above embodiments, the image processing module includes:

- a first pixel coordinate determining unit configured to determine a to-be-processed pixel coordinate in the to-be-processed image according to at least one model texture coordinate in a mesh model based on the transform matrix;
- a second pixel coordinate determining unit, configured to determine a target pixel coordinate of the at least one model texture coordinate in the to-be-processed image based on at least one to-be-processed pixel coordinate, the at least one model texture coordinate, and the speed field map; and
- a style texture coordinate determining unit, configured to determine, based on at least one target pixel coordinate and the transform matrix, a target style texture coordinate of the at least one model texture coordinate corresponding to the style map; and
- a special effect image determining unit, configured to determine the target special effect image based on a target pixel coordinate corresponding to a same model texture coordinate and a pixel attribute of the target style texture coordinate.

Based on the above embodiment, the first pixel coordinate determining unit is configured to determine, for a model texture coordinate, to-be-processed pixel coordinates of the current model texture coordinate in the to-be-processed image based on a current model texture coordinate left-multiplied by the transform matrix, where the transform matrix includes a model matrix, a visual matrix, and a projection matrix.

Based on the above embodiment, the second pixel coordinate determining unit includes:

- a displacement texture coordinate determining subunit, configured to, for a model texture coordinate, determining, in the speed field map, a current displacement texture coordinate corresponding to a current model texture coordinate; and
- a target pixel coordinate determining subunit, configured to determining a target pixel coordinate of the current model texture coordinate based on the current displacement texture coordinate and a corresponding to-be-processed pixel coordinate.

Based on the above embodiments, the target pixel coordinate determining subunit includes:

- a coordinate offset determining subunit, configured to obtaining a pixel attribute corresponding to the current displacement texture coordinate, and determining a coordinate offset based on at least two attribute values in the pixel attribute; and accumulating the to-be-processed pixel coordinates based on the coordinate offset to obtain the target pixel coordinate.

Based on the above embodiment, the style texture coordinate determining unit is configured to, obtain, in the style map, a target style texture coordinate corresponding to a current model texture coordinate based on a target pixel coordinate of the current model texture coordinate left-multiplied by an inverse matrix of the transform matrix.

Based on the above embodiment, the special effect image determining unit includes:

a pixel attribute obtaining subunit, configured to obtain, for a model texture coordinate, obtain a first pixel attribute of a target pixel coordinate in the to-be-processed image corresponding to a current model texture coordinate, and obtaining, in the style map, a second pixel attribute corresponding to the target style texture coordinate;

a target pixel attribute determining subunit, configured to determine a target pixel attribute used for rendering the current model texture coordinate based on the first pixel attribute and the second pixel attribute; and a target special effect image determining subunit, configured to determine the target special effect image based on a target pixel attribute of the at least one model texture coordinate and the to-be-processed image.

Based on the above embodiment, the target special effect image determining subunit is further configured to determine the target special effect image based on a target pixel attribute corresponding to the face region and a pixel attribute other than the face region in the to-be-processed image.

Based on the above embodiment, the apparatus further includes: a special effect video determining module, configured to splice the at least one target special effect image to obtain the target special effect video.

Based on the above embodiments, the style feature of the style map corresponds to a contemporary feature or a geographic area feature.

According to the embodiment of the disclosure, when the to-be-processed image containing the target object is collected, the style map, the transform matrix and the speed field map corresponding to the to-be-processed image are determined; based on the single rendering channel, the style map, the transform matrix, the speed field map and the to-be-processed image are processed to obtain the target special effect image corresponding to the to-be-processed image, so that avoids that a plurality of intermediate transition images need to be obtained when the multi-rendering channels are used for data rendering processing, and the intermediate transition image is rendered based on the next rendering channel. That is, not only is the multiple rendering channels participating in the whole rendering process, but also the intermediate image needs to be stored in the rendering process, the situation that the memory is occupied exists, the data rendering data is carried out based on a single rendering channel, the situation that the memory is occupied and the number of rendering channels is large can be avoided, and the image rendering efficiency can be improved.

The image processing apparatus provided by the embodiments of the disclosure may perform the image processing method provided by any embodiment of the disclosure, and has functional modules and beneficial effects corresponding to the execution method.

It should be noted that the units and modules included in the above apparatus are only divided according to the function logic, but are not limited to the above division, as long as the corresponding functions can be implemented; in addition, the specific names of the functional units are merely for ease of distinguishing, and are not intended to limit the protection scope of the embodiments of the disclosure.

Figure 5:
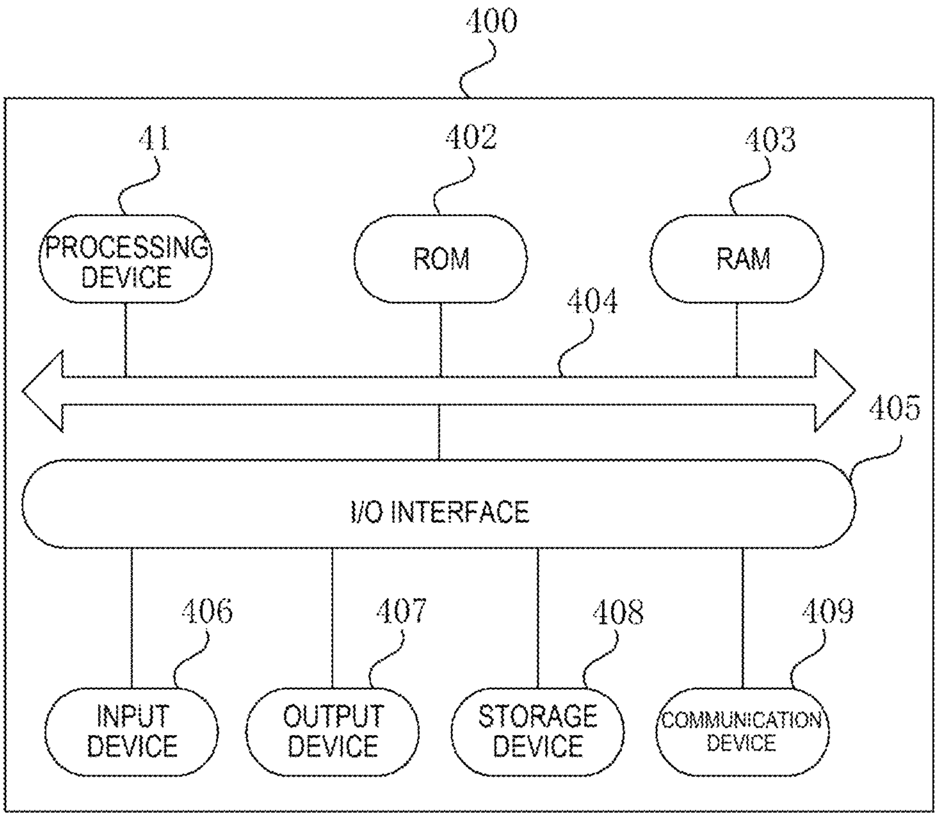
FIG. 5 is a schematic structural diagram of an electronic device according to an embodiment of the disclosure.

FIG. 5 is a schematic structural diagram of an electronic device according to an embodiment of the disclosure. Reference is now made to FIG. 5, FIG. 5 is a schematic structural diagram of an electronic device (such as the terminal device or server in FIG. 5) suitable for implementing the embodiments of the disclosure. The terminal device in the embodiments of the disclosure may include, but is not limited to, a mobile terminal such as a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), and a fixed terminal such as a digital television (TV), a desktop computer, or the like. The electronic device shown in FIG. 5 is merely an example, and should not impose any limitation on the functions and scope of use of the embodiments of the disclosure.

As shown in FIG. 5, the electronic device 400 may include a processing device (for example, a central processing unit, a graphics processor, etc.) 401, which may perform various appropriate actions and processing according to a program stored in a read-only memory (ROM) 402 or a program loaded into a random access memory (RAM) 403 from a storage device 408. In the RAM 403, various programs and data required by the operation of the electronic device 400 are also stored. The processing device 401, the ROM 402, and the RAM 403 are connected to each other through a bus 404. An input/output (I/O) interface 405 is also connected to the bus 404.

Generally, the following devices may be connected to the I/O interface 405: an input device 406 including, for example, a touch screen, a touch pad, a keyboard, a mouse, a camera, a microphone, an accelerometer, a gyroscope, etc.; an output device 407 including, for example, a liquid crystal display (LCD), a speaker, a vibrator, etc.; a storage device 408 including, for example, a magnetic tape, a hard disk, etc.; and a communication device 409. The communication device 409 may allow the electronic device 400 to communicate wirelessly or wired with other devices to exchange data. While FIG. 5 shows an electronic device 400 having various devices, it should be understood that it is not required to implement or have all illustrated devices. More or fewer devices may alternatively be implemented or provided.

In particular, according to an embodiment of the disclosure, the process described above with reference to the flowchart may be implemented as a computer software program. For example, embodiments of the disclosure include a computer program product comprising a computer program embodied on a non-transitory computer readable medium, the computer program comprising program code for performing the method shown in the flowchart. In such embodiments, the computer program may be downloaded and installed from the network through the communication device 409, or installed from the storage device 408, or from the ROM 402. When the computer program is executed by the processing device 401, the above functions defined in the method of the embodiments of the disclosure are performed.

The names of messages or information interaction between multiple devices in embodiments of the disclosure are for illustrative purposes only and are not intended to limit the scope of such messages or information.

The electronic device provided by the embodiments of the disclosure and the image processing method provided in the above embodiments belong to the same inventive concept, technical details not described in detail in this embodiment may refer to the above embodiments, and the present embodiment has the same beneficial effects as the above embodiments.

An embodiment of the disclosure provides a computer storage medium having a computer program stored thereon, the program, when executed by a processor, implements the image processing method provided in the above embodiments.

It should be noted that the computer-readable medium described in the above disclosure may be a computer readable signal medium, a computer readable storage medium, or any combination of the above two. The computer-readable storage medium may be, for example, but not limited to, an electrical, magnetic, optical, electromagnetic, infrared, or semiconductor system, device, or apparatus, or any combination thereof. Examples of the computer-readable storage medium may include, but are not limited to, an electrical connection having one or more wires, a portable computer diskette, a hard disk, a random access memory (RAM), a read-only memory (ROM), an erasable programmable read-only memory (EPROM) or a flash memory, an optical fiber, a portable compact disk read-only memory (CD-ROM), an optical storage device, a magnetic storage device, or any suitable combination thereof. In the disclosure, a computer-readable storage medium may be any tangible medium containing or storing a program that may be used by or in connection with an instruction execution system, apparatus, or device. In the disclosure, a computer readable signal medium may include a data signal propagated in baseband or as part of a carrier, where the computer readable program code is carried. Such propagated data signals may take a variety of forms including, but not limited to, electromagnetic signals, optical signals, or any suitable combination of the above. The computer readable signal medium may also be any computer readable medium other than a computer readable storage medium that may send, propagate, or transmit a program for used by or in connection with an instruction execution system, apparatus, or device. The program code embodied on the computer-readable medium may be transmitted by any suitable medium, including but not limited to: wires, optical cables, Radio Frequency (RF), and the like, or any suitable combination thereof.

In some implementations, the client, server may communicate using any currently known or future developed network protocol, such as HTTP (HyperText Transfer Protocol), and may be interconnected with any form or medium of digital data communication (e.g., a communication network). Examples of communication networks include Local Area Networks (LANs), Wide Area Networks (WANs), Internet networks (e.g., the Internet), and peer-to-peer networks (e.g., ad hoc peer-to-peer networks), as well as any currently known or future developed networks.

The computer-readable medium described above may be included in the electronic device; or may be separately present without being assembled into the electronic device.

The computer-readable medium described above carries one or more programs, and when the one or more programs are executed by the electronic device, cause the electronic device to:

determine a style map, a transform matrix, and a speed field map corresponding to the to-be-processed image when the to-be-processed image containing the target object is collected; and process the style map, the transform matrix, the speed field map and the to-be-processed image based on a single rendering channel to obtain a target special effect image corresponding to the to-be-processed image.

The storage medium may be a non-transitory storage medium.

Computer program code for performing the operations of the disclosure may be written in one or more programming languages or combinations thereof, including, but not limited to, object oriented programming languages such as Java, Smalltalk, C++, and conventional procedural programming languages, such as the "C" language or similar programming languages. The program code may execute entirely on a user computer, partially on a user computer, as a stand-alone software package, partially on a user computer and partially on a remote computer, or entirely on a remote computer or server. In the case of a remote computer, the remote computer may be connected to the user computer through any kind of network, including a local area network (LAN) or a wide area network (WAN), or may be connected to an external computer (e.g., connected through the Internet using an Internet service provider).

The flowcharts and block diagrams in the figures illustrate architecture, functionality, and operation of possible implementations of systems, methods, and computer program products according to various embodiments of the disclosure. In this regard, each block in the flowchart or block diagram may represent a module, program segment, or portion of code that includes one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the disclosure may be implemented in software, or may be implemented in hardware. Wherein the names of units do not in some way constitute a limitation on the units itself, for example, the first obtaining unit may be further described as "obtaining at least two units of Internet Protocol addresses".

The functions described above may be performed, at least in part, by one or more hardware logic components. For example, without limitation, the exemplary types of hardware logic components that may be used include: a field programmable gate array (FPGA), an application specific integrated circuit (ASIC), an application specific standard product (ASSP), a system on chip (SOC), a complex programmable logic device (CPLD), and the like.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the above. Examples of machine-readable storage media may include an electrical connection based on one or more lines, a portable computer disk, a hard disk, a random access memory (RAM), a read-only memory (ROM), an erasable programmable read-only memory (EPROM) or a flash memory, an optical fiber, a portable compact disk read-only memory (CD-ROM), an optical storage device, a magnetic storage device, or any suitable combination of the above. It should be understood by those skilled in the art that the disclosure involved in disclosure is not limited to the embodiments in which the above technical features are combined specifically, and should also cover other embodiments formed by any combination of the above technical features or their equivalent features without departing from the disclosed concept. For example, the above features and technical features (but not limited to) having similar functions disclosed in the disclosure may be replaced with each other to form the embodiments.

Further, while operations are depicted in a particular order, this should not be understood to require that these operations be performed in the particular order shown or in sequential order. In certain circumstances, multitasking and parallel processing may be advantageous. Likewise, while several specific implementation details are included in the discussion above, these should not be construed as limiting the scope of the disclosure. Certain features described in the context of separate embodiments may also be implemented in combination in a single embodiment. Conversely, the various features described in the context of a single embodiment may also be implemented in multiple embodiments either individually or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

I claim:

1. An image processing method, comprising:

collecting a to-be-processed image containing a target object, and determining a style map, a transform matrix, and a speed field map that correspond to the to-be-processed image; and processing the style map, the transform matrix, the speed field map and the to-be-processed image based on a single rendering channel to obtain a target special effect image corresponding to the to-be-processed image.

2. The method of claim 1, wherein a trigger timing of the collecting a to-be-processed image containing the target object comprises at least one of the following:

detecting that a special effect processing prop is triggered;

detecting that collected audio information triggers a special effect wake-up word;

detecting that an in-shot image includes a target object; or detecting that a body action of the target object is consistent with a preset body action.

3. The method of claim 1, wherein the style map is determined by:

processing the to-be-processed image based on a target style map generative model to obtain a style map corresponding to a target region, wherein the target region corresponds to a face region of the target object.

4. The method of claim 1, wherein the transform matrix is determined by:

determining a transform matrix corresponding to the to-be-processed image in a rendering pipeline, to transform vertex texture coordinates of a mesh model based on the transform matrix, so that the transformed mesh model corresponds to a face region of the target object in the to-be-processed image; wherein the mesh model corresponds to the face region;

wherein model texture coordinates of the mesh model correspond to texture coordinates of the style map and the speed field map, respectively, and the model texture coordinates comprise vertex texture coordinates.

5. The method of claim 1, wherein the processing the style map, the transform matrix, the speed field map and the to-be-processed image based on a single rendering channel to obtain a target special effect image corresponding to the to-be-processed image comprises:

determining at least one to-be-processed pixel coordinate in the to-be-processed image according to at least one model texture coordinate in a mesh model based on the transform matrix;

determining at least one target pixel coordinate of the at least one model texture coordinate in the to-be-processed image based on the at least one to-be-processed pixel coordinate, the at least one model texture coordinate, and the speed field map;

determining, based on the at least one target pixel coordinate and the transform matrix, a target style texture coordinate of the at least one model texture coordinate corresponding to the style map; and determining the target special effect image based on the target pixel coordinate corresponding to the same model texture coordinate and a pixel attribute of the target style texture coordinate.

6. The method of claim 5, wherein the determining at least one to-be-processed pixel coordinate in the to-be-processed image according to at least one model texture coordinate in a mesh model based on the transform matrix comprises:

determining at least one to-be-processed pixel coordinate of the at least one model texture coordinate in the to-be-processed image based on the at least one model texture coordinate left-multiplied by the transform matrix;

wherein the transform matrix includes a model matrix, a visual matrix, and a projection matrix.

7. The method of claim 5, wherein the determining at least one target pixel coordinate of the at least one model texture coordinate in the to-be-processed image based on the at least one to-be-processed pixel coordinate, the at least one model texture coordinate, and the speed field map comprises:

for a model texture coordinate, determining, in the speed field map, a current displacement texture coordinate corresponding to a current model texture coordinate; and determining a target pixel coordinate of the current model texture coordinate based on the current displacement texture coordinate and a corresponding to-be-processed pixel coordinate.

8. The method of claim 7, wherein the determining the target pixel coordinate of the current model texture coordinate according to the current displacement texture coordinate and the corresponding to-be-processed pixel coordinate comprises:

obtaining a pixel attribute corresponding to the current displacement texture coordinate, and determining a coordinate offset based on at least two attribute values in the pixel attribute; and accumulating the to-be-processed pixel coordinates based on the coordinate offset to obtain the target pixel coordinate.

9. The method of claim 5, wherein the determining, based on the at least one target pixel coordinate and the transform matrix, a target style texture coordinate of the at least one model texture coordinate corresponding to the style map comprises:

obtaining, in the style map, a target style texture coordinate corresponding to a current model texture coordinate based on a target pixel coordinate of the current model texture coordinate left-multiplied by an inverse matrix of the transform matrix.

10. The method of claim 5, wherein the determining the target special effect image based on the target pixel coordinate corresponding to the same model texture coordinate and the pixel attribute of the target style texture coordinate comprises:

for a model texture coordinate, obtaining a first pixel attribute of a target pixel coordinate in the to-be-processed image corresponding to a current model texture coordinate, and obtaining, in the style map, a second pixel attribute corresponding to the target style texture coordinate;

determining a target pixel attribute used for rendering the current model texture coordinate based on the first pixel attribute and the second pixel attribute; and determining the target special effect image based on a target pixel attribute of the at least one model texture coordinate and the to-be-processed image.

11. The method of claim 10, wherein the determining the target special effect image based on a target pixel attribute of the at least one model texture coordinate and the to-be-processed image comprises:

determining the target special effect image based on a target pixel attribute corresponding to a face region and a pixel attribute other than the face region in the to-be-processed image.

12. The method of claim 1, further comprising:

splicing the at least one target special effect image to obtain the target special effect video.

13. The method of claim 1, wherein a style feature of the style map corresponds to a contemporary feature or a geographic area feature.

14. An electronic device, comprising:

one or more processors;

a storage device configured to store one or more programs, when the one or more programs are executed by the one or more processors, the one or more processors implementing the image processing method comprising:

collecting a to-be-processed image containing a target object, and determining a style map, a transform matrix, and a speed field map that correspond to the to-be-processed image; and processing the style map, the transform matrix, the speed field map and the to-be-processed image based on a single rendering channel to obtain a target special effect image corresponding to the to-be-processed image.

15. The device of claim 14, wherein a trigger timing of the collecting a to-be-processed image containing the target object comprises at least one of the following:

detecting that a special effect processing prop is triggered;

detecting that collected audio information triggers a special effect wake-up word;

detecting that an in-shot image includes a target object; or detecting that a body action of the target object is consistent with a preset body action.

16. The device of claim 14, wherein the style map is determined by:

processing the to-be-processed image based on a target style map generative model to obtain a style map corresponding to a target region, wherein the target region corresponds to a face region of the target object.

17. The device of claim 14, wherein the transform matrix is determined by:

determining a transform matrix corresponding to the to-be-processed image in a rendering pipeline, to transform vertex texture coordinates of a mesh model based on the transform matrix, so that the transformed mesh model corresponds to a face region of the target object in the to-be-processed image; wherein the mesh model corresponds to the face region;

wherein model texture coordinates of the mesh model correspond to texture coordinates of the style map and the speed field map, respectively, and the model texture coordinates comprise vertex texture coordinates.

18. The device of claim 14, wherein the processing the style map, the transform matrix, the speed field map and the to-be-processed image based on a single rendering channel to obtain a target special effect image corresponding to the to-be-processed image comprises:

determining at least one to-be-processed pixel coordinate in the to-be-processed image according to at least one model texture coordinate in a mesh model based on the transform matrix;

determining at least one target pixel coordinate of the at least one model texture coordinate in the to-be-processed image based on the at least one to-be-processed pixel coordinate, the at least one model texture coordinate, and the speed field map;

determining, based on the at least one target pixel coordinate and the transform matrix, a target style texture coordinate of the at least one model texture coordinate corresponding to the style map; and determining the target special effect image based on the target pixel coordinate corresponding to the same model texture coordinate and a pixel attribute of the target style texture coordinate.

19. The device of claim 18, wherein the determining at least one to-be-processed pixel coordinate in the to-be-processed image according to at least one model texture coordinate in a mesh model based on the transform matrix comprises:

determining at least one to-be-processed pixel coordinate of the at least one model texture coordinate in the to-be-processed image based on the at least one model texture coordinate left-multiplied by the transform matrix;

wherein the transform matrix includes a model matrix, a visual matrix, and a projection matrix.

20. A non-transitory storage medium comprising computer executable instructions which, when executed by a computer processor, are configured to perform the image processing method comprising:

collecting a to-be-processed image containing a target object, and determining a style map, a transform matrix, and a speed field map that correspond to the to-be-processed image; and processing the style map, the transform matrix, the speed field map and the to-be-processed image based on a single rendering channel to obtain a target special effect image corresponding to the to-be-processed image.

* * * * *